(12) United States Patent
Langenfeld

(10) Patent No.: US 12,637,036 B1
(45) Date of Patent: May 26, 2026

(54) CLAMPING BRAKE FOR HYDRAULIC ROTATING BLOCK

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 19/188,901

(22) Filed: Apr. 24, 2025

Related U.S. Application Data

(60) Provisional application No. 63/638,716, filed on Apr. 25, 2024.

(51) Int. Cl.
| | |
|---|---|
| *B60T 1/06* | (2006.01) |
| *F15B 15/14* | (2006.01) |
| *F16D 49/18* | (2006.01) |
| *F16D 49/20* | (2006.01) |
| *F16D 65/18* | (2006.01) |
| *F16H 61/4157* | (2010.01) |
| *F16D 125/30* | (2012.01) |

(52) U.S. Cl.
CPC .......... *B60T 1/062* (2013.01); *F15B 15/1404* (2013.01); *F15B 15/1428* (2013.01); *F16D 49/18* (2013.01); *F16D 49/20* (2013.01); *F16D 65/18* (2013.01); *F16H 61/4157* (2013.01); *F16D 2125/30* (2013.01)

(58) Field of Classification Search
CPC .......... B60T 1/062; F16D 49/18; F16D 49/20; F16H 61/4157
See application file for complete search history.

(56) References Cited

U.S. PATENT DOCUMENTS

| | | | | |
|---|---|---|---|---|
| 4,053,032 A | * | 10/1977 | McDonald | F16D 49/20 |
| | | | | 188/77 R |
| 4,097,084 A | * | 6/1978 | Russell | B66C 1/422 |
| | | | | 294/104 |
| 6,811,510 B1 | | 11/2004 | Langenfeld et al. | |
| 7,134,276 B1 | | 11/2006 | Langenfeld et al. | |
| 8,820,066 B1 | * | 9/2014 | Langenfeld | B60W 10/196 |
| | | | | 60/487 |

(Continued)

FOREIGN PATENT DOCUMENTS

| | | | | |
|---|---|---|---|---|
| GB | 1476298 A | * | 6/1977 | F16D 59/02 |

*Primary Examiner* — Thomas E Lazo
(74) *Attorney, Agent, or Firm* — Neal, Gerber & Eisenberg LLP

(57) ABSTRACT
A cylinder-block-clamping brake apparatus has both parking brake capability and limited dynamic braking capability. The brake apparatus includes a first clamp arm and an opposed second clamp arm that are disposed about a rotating cylinder block that is drivingly engaged to a motor shaft of a hydraulic or hydrostatic drive unit. A first end of each clamp arm is in contact with a brake actuation cam and a second end of each arm is configured to interface one with the other to form a floating slide-pivot joint. Each clamp arm includes at least one block contact pad formed thereon. When the cam is pivoted in either direction, block contact pads formed on the clamp arms are forced against the cylinder block to prevent rotation of the cylinder block and motor shaft.

19 Claims, 4 Drawing Sheets

(56)  References Cited

U.S. PATENT DOCUMENTS

| | | | | |
|---|---|---|---|---|
| 8,919,224 | B1 * | 12/2014 | Bennett ................... | B60T 1/062 |
| | | | | 188/78 |
| 9,371,842 | B1 * | 6/2016 | Langenfeld ......... | F16H 61/4157 |
| 9,873,325 | B1 * | 1/2018 | Buescher ............. | B60K 17/105 |
| 2022/0095541 | A1 * | 3/2022 | Terada .................. | F16H 63/345 |

* cited by examiner

CLAMPING BRAKE FOR HYDRAULIC ROTATING BLOCK

CROSS-REFERENCE

This application claims the benefit of U.S. Provisional Patent Application No. 63/638,716 filed on Apr. 25, 2024. The contents of the prior application are incorporated herein by reference in its entirety.

BACKGROUND

This application relates to a clamping brake apparatus for restricting rotation of a rotating cylinder block of a hydraulic drive apparatus such as a piston motor.

SUMMARY

Hydraulic drive motors comprising a rotating cylinder block immersed in lubricant (e.g., oil) are used in many applications, including traction drives of utility vehicles such as riding lawn mowers, for one example. A need exists in the field of hydraulic and hydrostatic drive units for an improved brake apparatus that can be applied to the motor output of such drive units.

The cylinder-block-clamping brake apparatus disclosed herein has both parking brake capability and some dynamic braking capability, and may be used in hydraulic motor, hydrostatic transmission and hydrostatic transaxle applications. This brake exhibits increased motor output shaft holding torque compared to other brakes employed in such applications when the same torque is applied to a brake actuation shaft of each of these brakes.

In an illustrative embodiment disclosed herein, a floating pair of clamp arms (functionally similar to known brake shoes, but different in form and application of forces), with each clamp arm comprising two cylinder block contact pads that are symmetrically disposed about a plane passing through the center of a rotating cylinder block and through a symmetrical brake actuation cam, allows consistent contact forces to be applied to the cylinder block even when minor manufacturing profile variations exist. The contact surfaces of the cylinder block contact pads may be flat to help achieve these consistent contact forces. If the contact pads have arcuate block contact surfaces or there are more than two pads per clamp arm, manufacturing profile variations will contribute to torque holding capability variation among drive units.

The choice of an exemplary 30 degrees circumferential location of the symmetrically arranged contact pads on the clamp arms (as illustrated herein) represents a balancing of design considerations. For example, a smaller angle increases a wedging effect around the cylinder block, providing more holding torque for the same applied cam force, but a smaller angle also increases the travel needed at the cam interface to accommodate manufacturing tolerances. If the angle is too small, the brake will become self-locking, staying engaged even if the cam is pivoted to a disengaged position.

If only one contact pad is used per clamp arm (in an optional embodiment, not shown), the contact pads should be arcuate in form and of sufficient length to minimize lateral movement (or "play") of the clamp arms. Or, if only one flat (i.e., non-arcuate) contact pad is used per clamp arm (in another optional embodiment, not shown), excess lateral movement (or "play") of the clamp arms can be prevented by pinning the clamp arms opposite the cam location (i.e., pinning the clamp arm ends on an opposite side of the cylinder block in relation to the cam position).

A better understanding of the disclosure herein will be obtained from the following detailed description and accompanying drawings.

DETAILED DESCRIPTION OF THE DRAWINGS

The description that follows describes, illustrates and exemplifies one or more embodiments in accordance with its principles. This description is not provided to limit the disclosure to the embodiment(s) described herein, but rather to explain and teach the principles of the invention(s) disclosed herein in order to enable one of ordinary skill in the art to understand these principles and, with that understanding, be able to apply them to practice not only the embodiment(s) described herein, but also any other embodiment that may come to mind in accordance with these principles. The scope of the disclosure is intended to cover all such embodiments that may fall within the scope of the appended claims, either literally or under the doctrine of equivalents.

It should be noted that the drawings set forth herein are not necessarily drawn to scale and, in some instances, proportions may have been exaggerated to more clearly depict certain features. Positional references such as "upper" and "lower" may be used in regard to certain components as illustrated in the figures to aid in understanding, but are not to be construed as limiting since these components and the drive units in which they are housed may be oriented in various ways depending on the application in which they are used. As stated above, this specification is intended to be taken as a whole and interpreted in accordance with the principles of the invention(s) as taught herein and understood by one of ordinary skill in the art.

Figure 1:
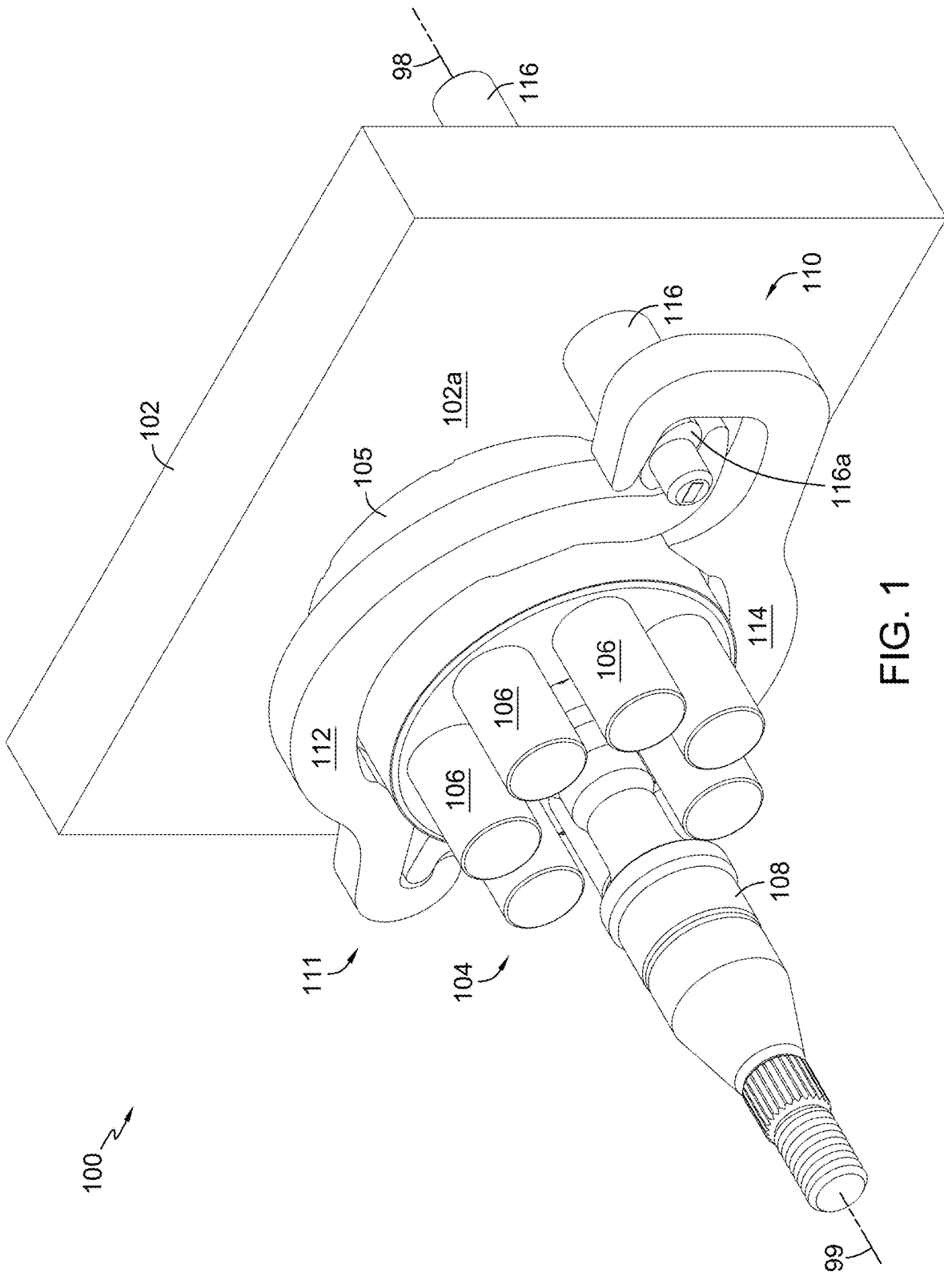
FIG. 1 is a perspective view of a representational hydraulic drive motor output group, including a cylinder-block-clamping brake apparatus of the instant disclosure.

FIG. 1 depicts a representational hydrostatic drive motor output group 100, including a representational end cap 102 comprising hydraulic fluid passages (not shown) and a hydraulic running surface 102a on which a rotating cylinder block group 104 is disposed. It should be noted that an "end cap" may also include a hydraulic pump running surface in a transmission application (such as a Hydro-Gear BDU™ transmission, for example). Also, in a hydrostatic transaxle unit (such as a Hydro-Gear ZT-2800® transaxle, for example) a "center section" enclosed within a transaxle housing and comprising hydraulic fluid passages, a pump cylinder block running surface, and a motor cylinder block running surface, is normally used instead of an "end cap" that typically serves as both a hydraulic component and a portion of the motor or transmission housing.

Rotating cylinder block group 104 includes cylinder block 105, axial pistons 106, and other components, such as piston springs (not shown). The hydraulically driven cylinder block 105 is drivingly engaged (via splines, for example)

to a motor shaft 108, as is known in the art. Rotating cylinder blocks with axial pistons similar to that depicted herein are illustrated and described in more detail in commonly-owned U.S. Pat. Nos. 6,811,510 and 7,134,276, the terms of which are incorporated herein by reference.

A cylinder-block-clamping brake apparatus 110 of the present disclosure is provided to clamp and hold cylinder block 105 to provide a braking torque to cylinder block 105, thereby restricting rotation of cylinder block 105 (and output shaft 108) as cylinder-block-clamping brake apparatus 110 is actuated/engaged. Cylinder-block-clamping brake apparatus 110 prevents rotation of cylinder block 105 when fully engaged. Cylinder-block-clamping brake apparatus 110 can be used as a parking brake of a utility vehicle, for example, and also has some dynamic braking capability. In certain applications, dynamic braking capability may be limited and may be recommended for emergency use or low speed use only.

As shown in FIGS. 1-4, cylinder-block-clamping brake apparatus 110 includes a first or upper clamp arm 112, a second or lower clamp arm 114, and a pivotable actuation shaft 116. In the exemplary embodiment depicted, a symmetrical cam 116a is disposed at a proximal end of actuation shaft 116. Cam 116a contacts a cam bar 112a formed on a first end of upper clamp arm 112 and a cam hook 114a formed on a first end of lower clamp arm 114. When actuation shaft 116 is pivoted about its pivot axis 98 in either direction, cam 116a bears against cam bar 112a and cam hook 114a, causing a clamping force to be applied to cylinder block 105 to slow and/or prevent rotation of cylinder block 105 and motor shaft 108 about their shared axis of rotation 99.

It should be noted that cylinder block 105 may be hydraulically rotated in either direction and motor shaft 108 may be configured to extend from either end or from both ends of cylinder block 105 along axis of rotation 99. Motor shaft 108 may also be referred to as an output shaft. Likewise, actuation shaft 116 may extend in either direction or both directions from cam 116a along pivot axis 98 to engage a component such as a control arm (not shown) at a distal end of actuation shaft 116. It will be understood that such a component may be located at other points along actuation shaft 116, and cam 116a need not be located at an end of actuation shaft 116. By way of example, in an alternative embodiment (not shown), actuation shaft 116 may be supported at both ends and cam 116a may be disposed between the two ends thereof.

Figure 2:
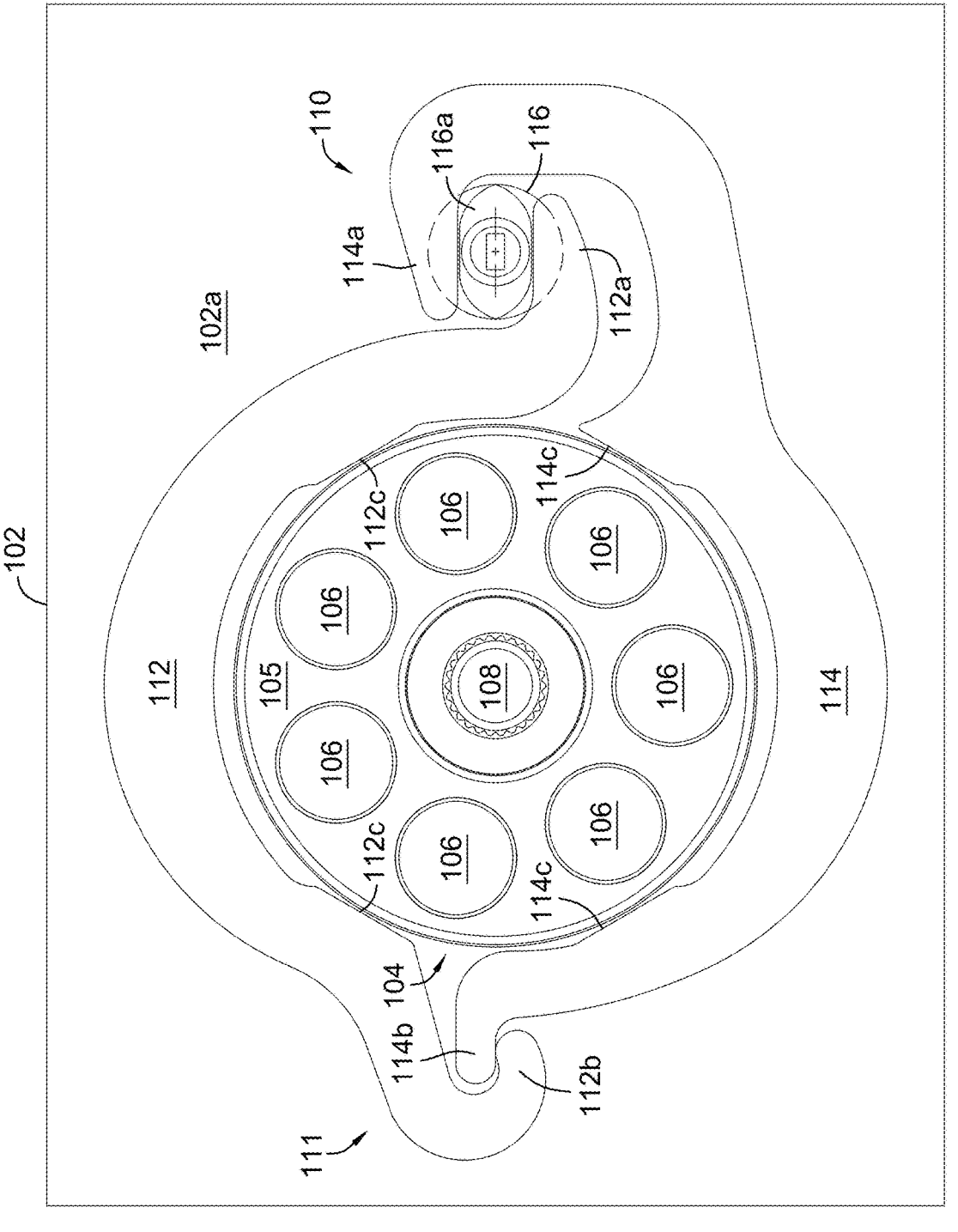
FIG. 2 is an elevational view of the cylinder-block-clamping brake apparatus of FIG. 1, in a disengaged state.
Figure 3:
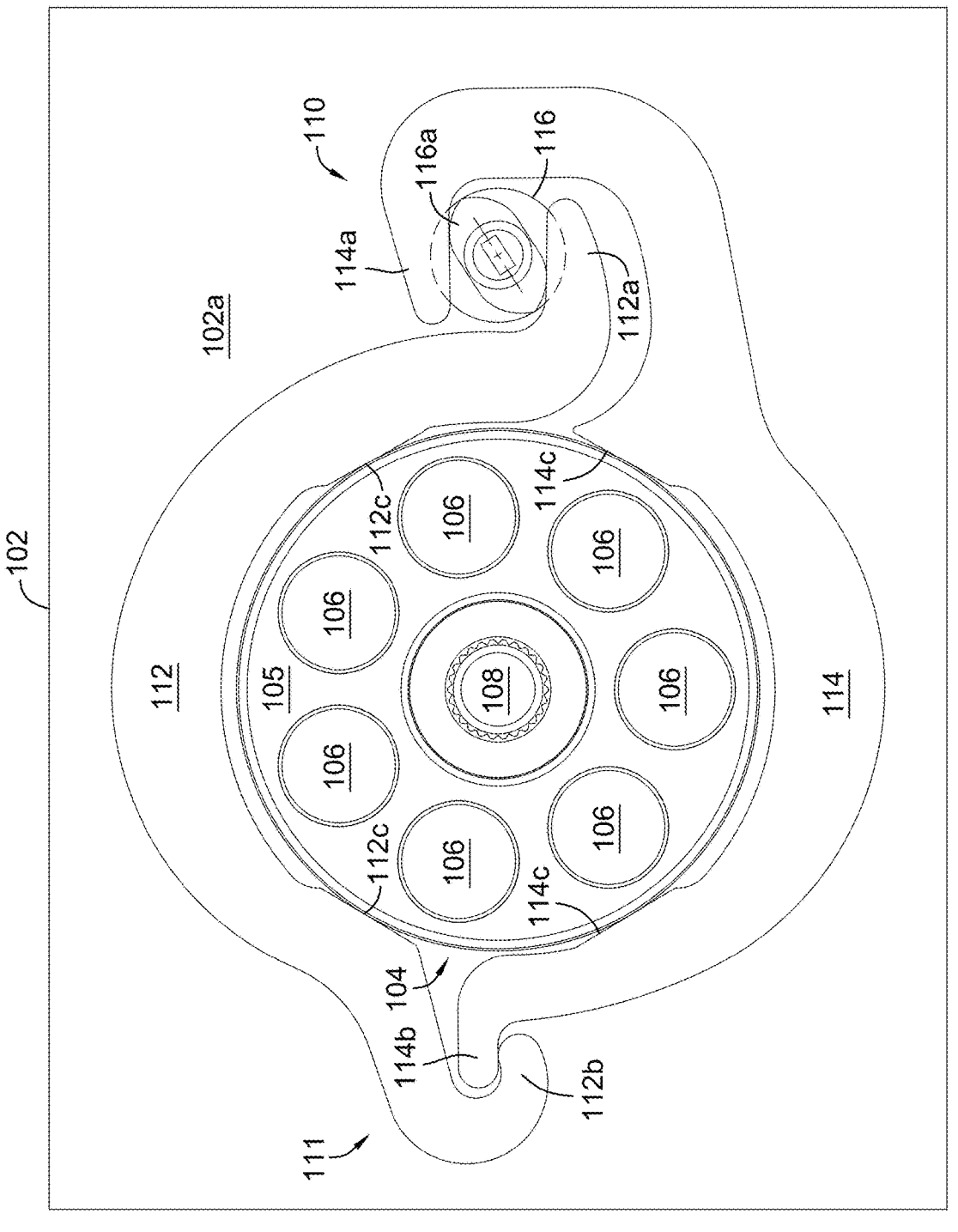
FIG. 3 is an elevational view of the cylinder-block-clamping brake apparatus of FIG. 1, in an engaged state.

Brake apparatus 110 is illustrated in its disengaged position in FIGS. 1 and 2, and in its engaged position in FIG. 3. Referring primarily to FIGS. 2 and 3, a slide-pivot hook 112b is formed on a second end of the upper clamp arm 112 and a slide-pivot bar 114b is formed on a second end of the lower clamp arm 114. Slide-pivot hook 112b wraps under and captures slide-pivot bar 114b to create an interlocked sliding pivot joint 111. That is, when cam 116a is pivoted, a shifting interface exists between the slide-pivot bar 114b and the slide-pivot hook 112b contact surfaces. In this interlocked floating joint configuration, bar 114b and hook 112b bear against each other and simultaneously slide and pivot when cam 116a is pivoted, causing block contact pads 112c and 114c formed on upper clamp arm 112 and lower clamp arm 114, respectively, to bear against the cylinder block 105 to slow and/or prevent rotation of cylinder block 105. Similarly, the cam-contacting bar end 112a (i.e., cam bar 112a) and cam-contacting hook end 114a (i.e., cam hook 114a) form an interlocking joint disposed about cam 116a. The cam-contacting surfaces of cam bar 112a and hook end

114a that contact cam 116a float radially relative to the cylinder block axis 99, thereby allowing the contacting forces of pads 112c and 114c to equalize. Equalizing these forces counteracts manufacturing variations to provide more consistent braking performance.

It should be noted that the floating joints of brake apparatus 110 are "interlocked" or "interlocking" when cam-contacting bar end 112a, cam-contacting hook end 114a, slide-pivot hook 112b, slide-pivot bar 114b, and cylinder block 105 are all present in an assembled configuration. The terms "cam-contacting hook" and "cam-contacting bar" are intended to be read broadly to encompass shapes that accomplish the function of hook end 114a and bar end 112a, respectively, by providing a structure to engage cam 116a and move the respective clamp arms when cam 116a is pivoted. Similarly, the terms "slide-pivot hook" and "slide-pivot bar" are intended to be read broadly to encompass shapes that accomplish the function of a sliding pivot joint to accomplish the goals described herein.

Figure 4:
FIG. 4 is an elevational view of the cylinder-block-clamping brake apparatus of FIG. 1, in a disengaged state, illustrating symmetrical disposition of block contact pads.

As illustrated in FIG. 4, block contact pads 112c and 114c in a disengaged state are symmetrically disposed about a plane 97 that passes through the center of cylinder block 105 and actuation shaft 116. The floating arrangement of clamp arms 112 and 114 in combination with the symmetrical disposition of block contact pads 112c and 114c in relation to plane 97 enables application of consistent contact forces on the cylinder block when actuation shaft 116 and cam 116a are pivoted in either direction. Cylinder block 105 rotation torque applied to clamp arms 112 and 114 is resisted only by the contact force of the clamp arms 112 and 114 against cam 116a.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A hydraulic drive apparatus, comprising:
   a rotatable cylinder block drivingly engaged to a motor shaft; and
   a brake apparatus, comprising:
      an actuation shaft pivotable about a pivot axis and having a cam disposed thereon;
      a first clamp arm comprising a cam-contacting bar end configured to contact the cam, a hook end opposite the cam-contacting bar end, and at least one first block contact pad disposed between the cam-contacting bar end and the hook end; and
      a second clamp arm comprising a cam-contacting hook end configured to contact the cam, a slide-pivot bar end opposite the cam-contacting hook end, the slide-pivot bar end captured by the hook end of the first clamp arm to form a slide-pivot joint, and at least one second block contact pad disposed between the cam-contacting hook end and the slide-pivot bar end;
      wherein pivoting of the actuation shaft about the pivot axis causes the first clamp arm and the second clamp arm to slidingly bear against one another to cause the at least one first block contact pad and the at least one second block contact pad to apply a clamping force to the rotatable cylinder block to provide a braking torque to the rotatable cylinder block.

2. The hydraulic drive apparatus of claim 1, wherein the cam is symmetrical about the pivot axis.

3. The hydraulic drive apparatus of claim 1, wherein the rotatable cylinder block accommodates axial pistons.

4. The hydraulic drive apparatus of claim 1, wherein the cam-contacting bar end and the cam-contacting hook end form an interlocking joint disposed about the cam.

5. The hydraulic drive apparatus of claim 4, wherein the interlocking joint is also a floating joint.

6. The hydraulic drive apparatus of claim 1, wherein the slide-pivot joint is also an interlocking joint.

7. The hydraulic drive apparatus of claim 1, wherein the slide-pivot joint is also a floating joint.

8. The hydraulic drive apparatus of claim 1, wherein contact surfaces of the at least one first block contact pad and the at least one second block contact pad are non-arcuate.

9. A brake apparatus for a rotatable cylinder block of a hydraulic drive, the brake apparatus comprising:

a first clamp arm and a second clamp arm, both clamp arms having a first end and a second end, and at least one block contact pad disposed between the respective first end and second end; and a brake actuation cam in contact with the first end of the first clamp arm and first end of the second clamp arm;

wherein the second end of the first clamp arm is configured to interface with the second end of the second clamp arm to form a floating joint, and wherein actuation of the brake actuation cam causes the at least one block contact pad of both the first clamp arm and the second clamp arm to engage and provide a braking force to the rotatable cylinder block.

10. The brake apparatus of claim 9, wherein the floating joint is a slide-pivot joint.

11. The brake apparatus of claim 9, wherein the brake actuation cam is symmetrical about a pivot axis of the brake actuation cam.

12. The brake apparatus of claim 9, wherein the rotatable cylinder block accommodates axial pistons.

13. The brake apparatus of claim 9, wherein the first end of the first clamp arm is a cam-contacting bar end and the first end of the second clamp arm is a cam-contacting hook end, and wherein the cam-contacting bar end and the cam-contacting hook end disposed about the brake actuation cam form a floating joint.

14. The brake apparatus of claim 9, wherein the at least one block contact pad of the first clamp arm and the at least one block contact pad of the second clamp arm each have a non-arcuate contact surface for engaging the rotatable cylinder block.

15. A hydraulic drive apparatus, comprising:

a cylinder block having an axis of rotation;

a brake actuation cam having a pivot axis;

a first arcuate clamp arm having a cam-contact bar end, a hook end opposite the cam-contact bar end, and a first set of two flat-surface contact pads disposed between the cam-contact bar end and the hook end; and a second arcuate clamp arm having a cam-contact hook end, a bar end opposite the cam-contact hook end, and a second set of two flat-surface contact pads disposed between the cam-contact hook end and the bar end;

wherein the axis of rotation and the pivot axis are parallel, and the first and second sets of flat-surface contact pads are symmetrically disposed about a plane passing through the axis of rotation and the pivot axis.

16. The hydraulic drive apparatus of claim 15, wherein the hook end and the bar end form a slide-pivot joint.

17. The hydraulic drive apparatus of claim 16, wherein the slide-pivot joint is also a floating joint.

18. The hydraulic drive apparatus of claim 16, wherein the slide-pivot joint is also an interlocking joint.

19. The hydraulic drive apparatus of claim 15, wherein the cylinder block accommodates axial pistons.

* * * * *